United States Patent [19]
Filipenco

[11] 3,912,938
[45] Oct. 14, 1975

[54] ELECTRICAL STATIONS OPERATED BY WAVES

[76] Inventor: Gregory D. Filipenco, 158 Green St., New York, N.Y.

[22] Filed: Jan. 25, 1974

[21] Appl. No.: 436,623

[52] U.S. Cl. .................. 290/53; 290/42; 417/330
[51] Int. Cl.² ............................................ F03B 13/12
[58] Field of Search ................. 290/42, 43, 53, 54; 417/330, 331, 332, 333, 334, 337

[56] References Cited
UNITED STATES PATENTS

| | | | |
|---|---|---|---|
| 3,204,110 | 8/1965 | Masuda | 290/53 X |
| 3,487,228 | 12/1969 | Kriegel | 290/53 X |
| 3,515,889 | 6/1970 | Kammerer | 290/53 |
| 3,569,725 | 3/1971 | Rosenberg | 290/42 |
| 3,603,804 | 9/1971 | Casey | 290/42 |
| 3,664,125 | 5/1972 | Strange | 290/53 |
| 3,746,875 | 7/1973 | Donatelli | 290/42 |

*Primary Examiner*—G. R. Simmons
*Attorney, Agent, or Firm*—Richards & Geier

[57] ABSTRACT

Electrical energy is produced by platforms floating upon water expanse oceans, seas, rivers or lakes, and movable by waves. The platforms carry electrical generators as well as means transforming the kinetic energy of the waves into mechanical energy which actuates these generators. These means may consist of hydraulic turbines combined with a pump water accumulator capable of transmitting water under pressure to a hydraulic motor operating the electrical generator. Other means may include floats or a pendulum swinging under the action of the waves.

3 Claims, 15 Drawing Figures

ELECTRICAL STATIONS OPERATED BY WAVES

This invention relates to electrical stations operated by waves.

An object of the present invention is to utilize the kinetic energy of waves of all types, namely, waves of oceans, seas, rivers and lakes to produce electrical energy.

It is apparent that this source of kinetic energy is free, and it is inexhaustible. It can be made to produce cheap electrical energy, also in inexhaustible amounts, by the use of a swimming electrical station.

According to a preferred embodiment of the inventive idea, this station has the shape of a swimming round platform, which is fixed by chains and a load to the bottom of the ocean. The platform carries a mechanism which transforms kinetic energy into electrical energy.

The mechanism may consist of a plurality of hydraulic turbines, which turn from the up-and-down movement of the waves. This then produces a flow of water which operates delivery pumps directing water to a water accumulator. From there, water under pressure flows to a hydraulic motor, which actuates a generator.

According to another embodiment of the present invention, floats are used which operate piston pumps transmitting water to a water accumulator. From the accumulator, water is sent under pressure to a hydraulic motor, which actuates a generator.

The hydraulic turbines may be connected to separate generators.

A single hydraulic cylinder may be carried by the platform and movably connected with a separate disk attached to the bottom of the ocean.

According to yet another embodiment of the invention, a heavy pendulum carried by the platform is connected by suitable means with hydraulic cylinders. When the platform is swung, the pendulum will try to maintain its position of rest and will actuate poston pumps which will transmit water to a water accumulator. From the accumulator, water under pressure will be transmitted to a hydraulic motor, which will actuate a generator.

Chains connecting the platform with the bottom of the ocean may be replaced by a specially constructed column.

The invention will appear more clearly from the following detailed description when taken in connection with the accompanying drawings, showing, by way of example only, preferred embodiments of the inventive idea.

Figure 2:
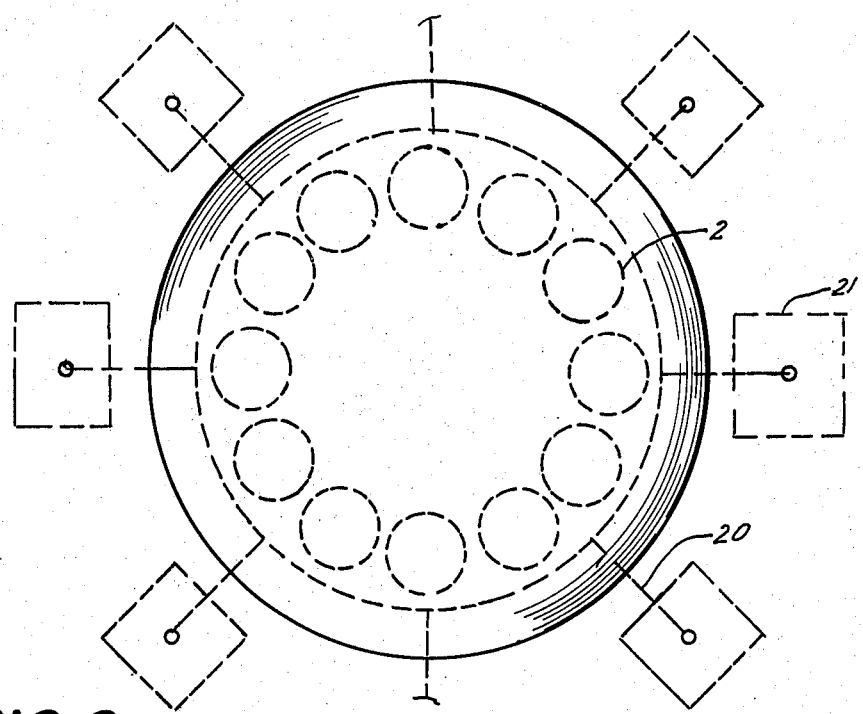
FIG. 2 is a top view of the platform shown in FIG. 1.
Figure 1:
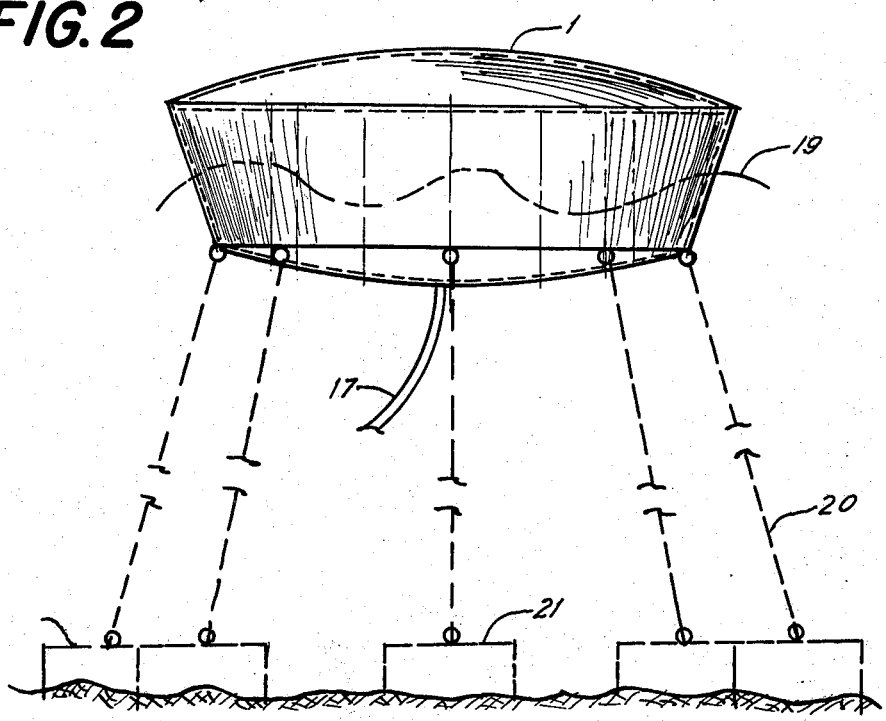
FIG. 1 is a side view of the floating platform of an electric station.
Figure 4:
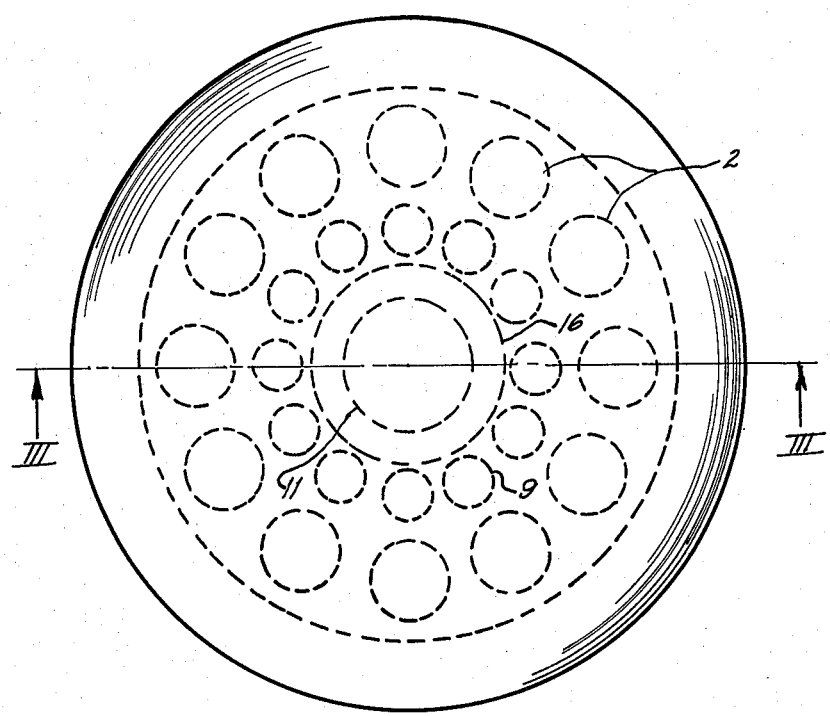
FIG. 4 is a top view of the platform shown in FIG. 3.

FIGS. 1 and 2 are a side view and a top view illustrating an electrical station of the present invention. They show a round platform 1 floating upon waves 19 and fixed by weights 21 lying upon the bottom of the ocean and attached to the platform 1 by chains 20.

In this embodiment of the present invention, means producing electricity include hydraulic turbines 2 arranged around a circle upon the platform 1.

Figure 3:
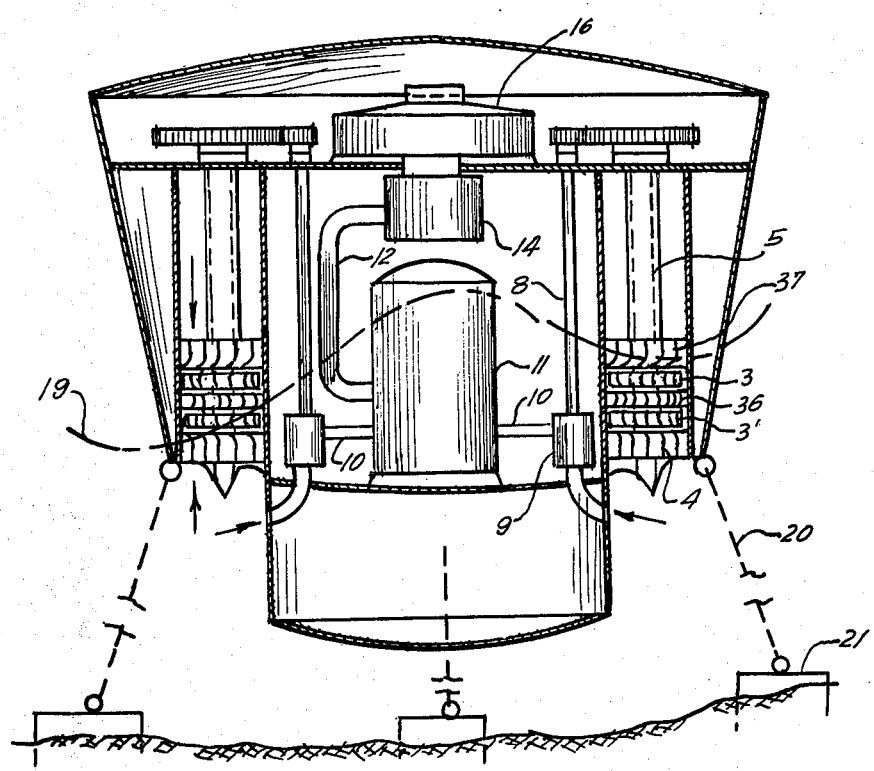
FIG. 3 shows a platform which has electricity-producing means, and is a section along the line III—III of FIG. 4.

As shown in FIG. 3, each turbine has wheels 3 and 3' and blades 4, 36 and 37. The shaft 5 of a turbine is connected with a gear wheel 6 meshing with a gear wheel 7 carried by a shaft 8. The turbine shafts 8 are connected with a centrally-running delivery pump 9. Delivery pump 9 is connected by pipes 10 with a central water accumulator 11 which is connected by a pipe 12 with a hydraulic motor 14. The motor 14 is connected with a generator 26.

Figure 5:
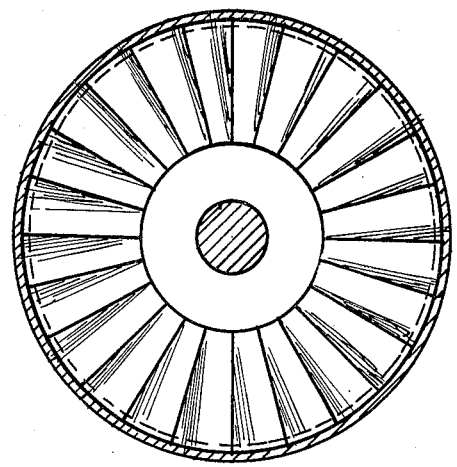
FIG. 5 is a diagrammatic view of a turbine.
Figure 6:
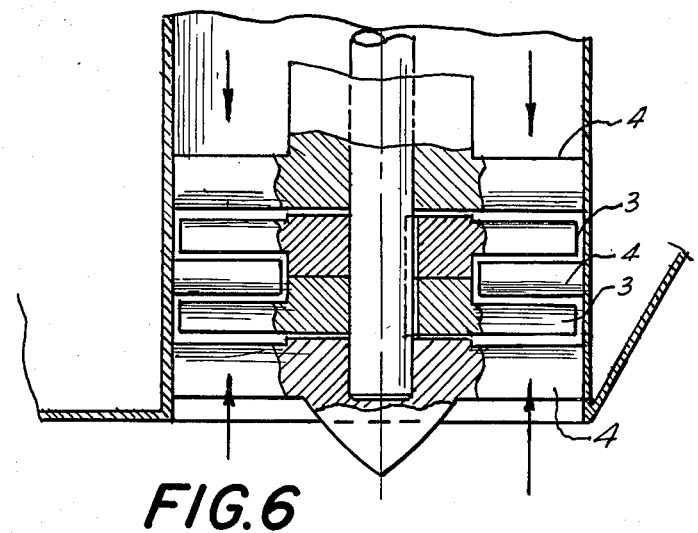
FIG. 6 is a section through the same turbine.
Figure 7:
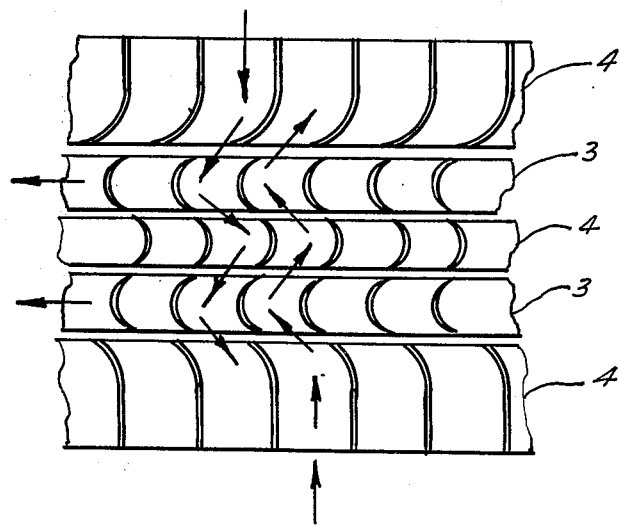
FIG. 7 is a diagram illustrating the turbine blades.

FIGS. 5, 6 and 7 illustrate a two-stage turbine having directing blades 4 and two turbine wheels 3. FIG. 7 shows an open view of the blades of the turbine.

The operation of this device is as follows:

When the waves move up-and-down, the platform will not move because of chains and weights connecting to the bottom of the ocean. But water in turbine containers will also move up-and-down to the extent determined by the height of the wave. During the upward movement, directing blades 4 will direct water to the turbine wheels 3. From wheels 3, water will reach directing blades 36, which will direct water to the second set of blades 3'' and through blades 37, it will move to the upper section of the turbine. When the wave is lowered, water in the turbines will also be lowered and will move through directing blades 37 to the wheels 3' and then through directing blades 36 to the other wheels 3. There, up-and-down movements will rotate the turbine. The rotation of the turbine will be transmitted through gears 6 and 7 and the shaft 8 to the delivery pump 9, which will push water into the water accumulator 11. Water under pressure will flow into the hydraulic motor 14, which will rotate the generator 16. Electrical current produced by the generator will be transmitted to a high-voltage transformer (not shown), and from there will flow through a cable 17 (FIG. 1), which will also extend upon the bottom of the ocean and will reach the shore for any suitable use.

While the turbine will not turn uniformly during the up-and-down movement of the wave, the delivery pump, the accumulator, the hydraulic motor and the generator will rotate uniformly.

Figure 9:
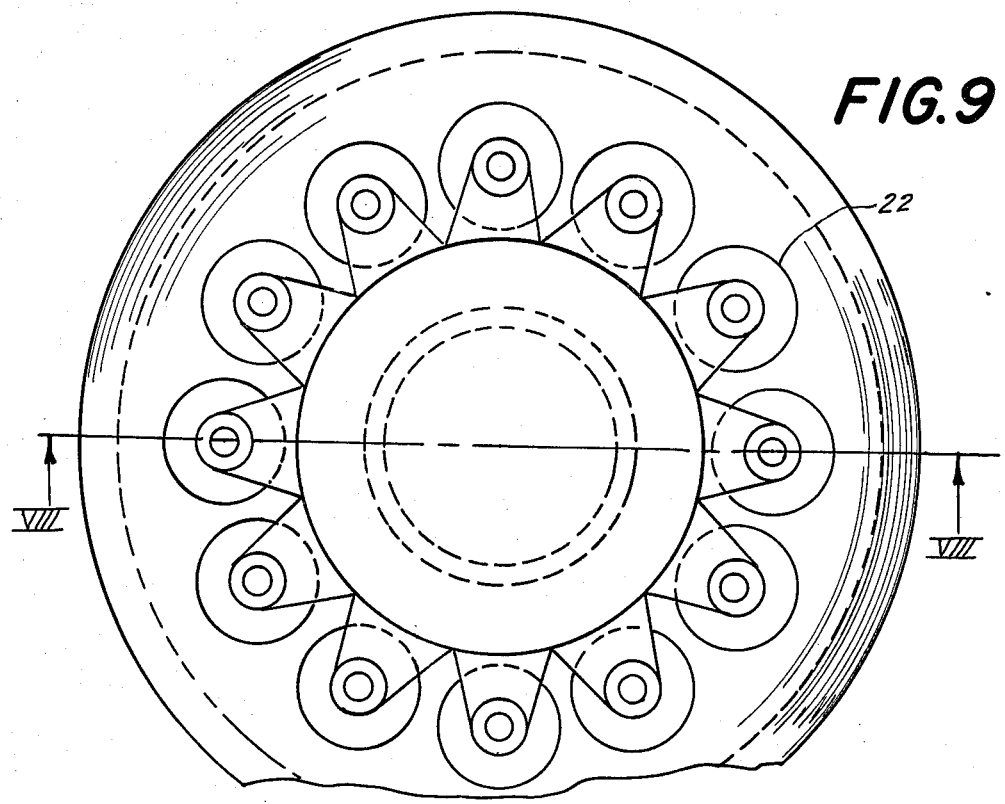
FIG. 9 is a top view of the platform shown in FIG. 8.
Figure 8:
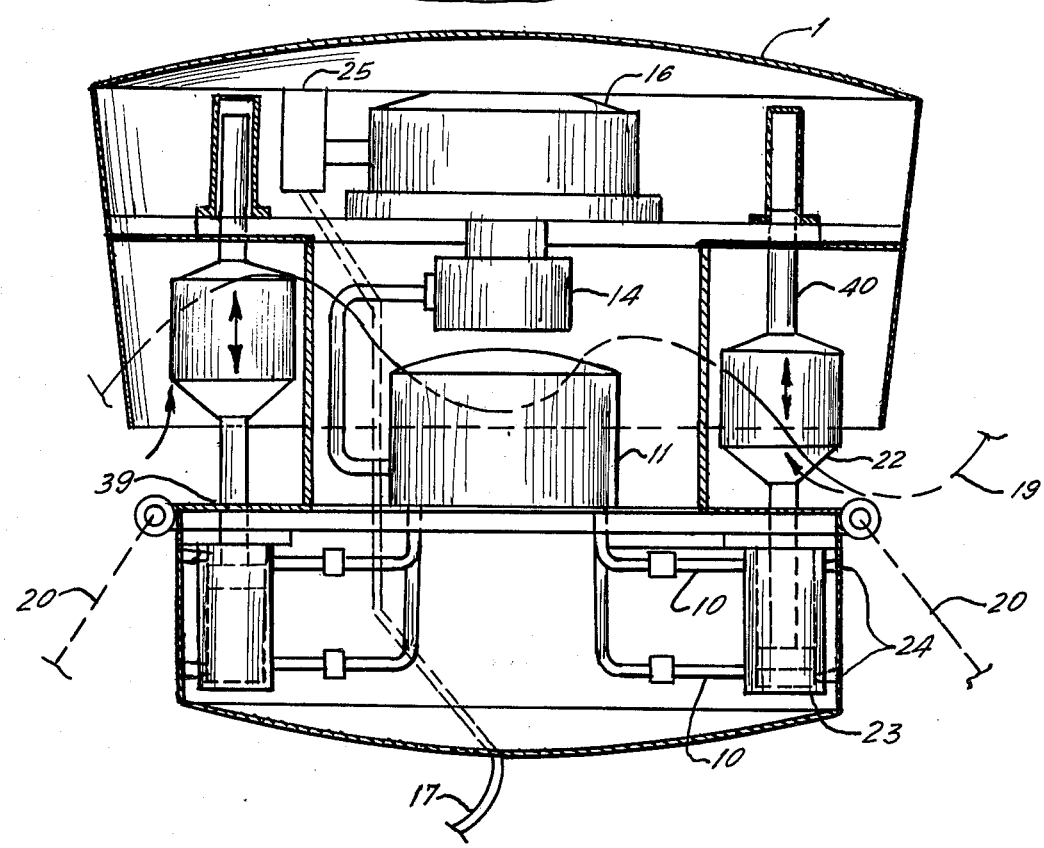
FIG. 8 is a section through a platform operated with floats along the line VIII—VIII of FIG. 9.

FIGS. 8 and 9 show an electrical station wherein kinetic energy is transmitted into electrical energy by means of floats. Around the platform 1' on the station are open compartments. In these compartments are the floats 22, located in a circle within the platform. Each float has a shaft 40 extending above and below the float and movable therewith. The upper part of the shaft 40 extends through a guide 38. The lower part of the shaft extends through the guide 39 and is connected with the piston of a piston pump 23. The piston pump 23 has two suction nozzles 24 and is connected by pipes 10' with a water accumulator 11'. The accumulator 11' is connected by a pipe with a hydraulic motor 14' connected with the generator 16'.

The operation of this device is as follows:

When the waves 19 move up and down, the platform 1' will be held by the chain 20, but the floats 22 will move up and down along with the waves. This movement of the floats will be transmitted to the pumps 23, which will suck in water through the openings 24. Water will flow through the pipes 10' into the water accumulator 11, and from there, it will flow under pressure to the hydraulic motor 14', which will be actuated and will operate the generator 16'.

Figure 11:
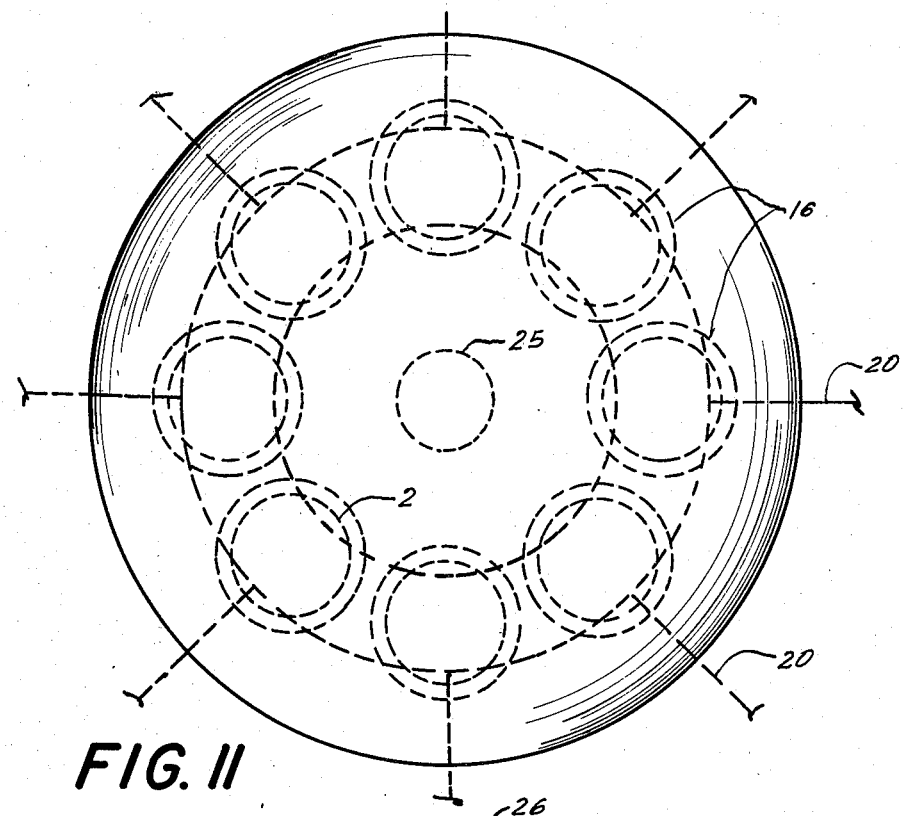
FIG. 11 is a top view of the platform shown in FIG. 10.
Figure 10:
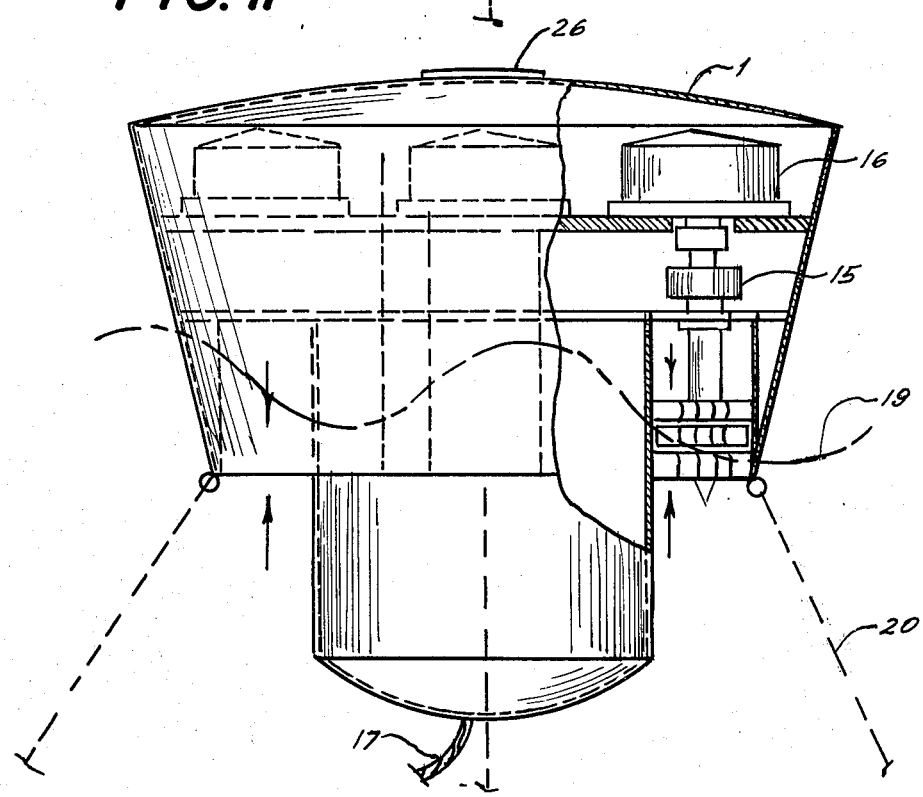
FIG. 10 is a section along the line X—X of FIG. 11 of a somewhat different construction.

FIGS. 10 and 11 show an electrical station, which is a variation of that shown in FIG. 3. In the construction shown in FIG. 10, each turbine 5 is connected with a separate generator 16 through a device 15, increasing the speed of the generator.

This device operates in a manner similar to those described. However, in this construction, the rotation of the generators is not uniform.

Figure 13:
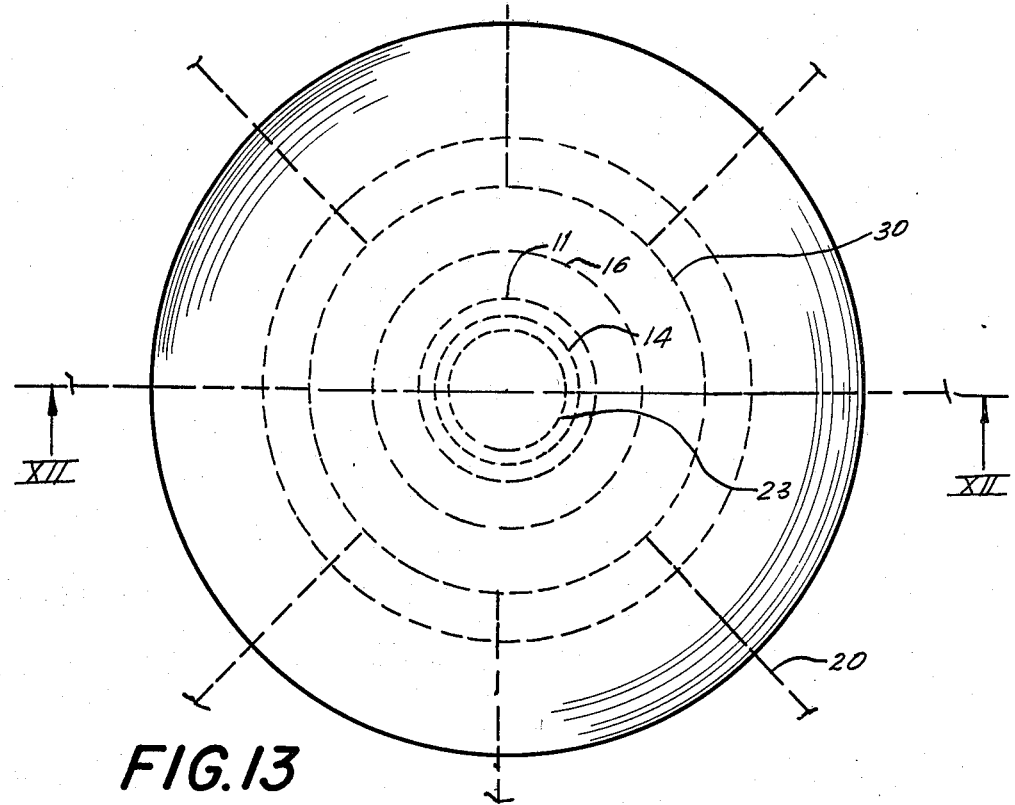
FIG. 13 is a top view of the platform shown in FIG. 12.
Figure 12:
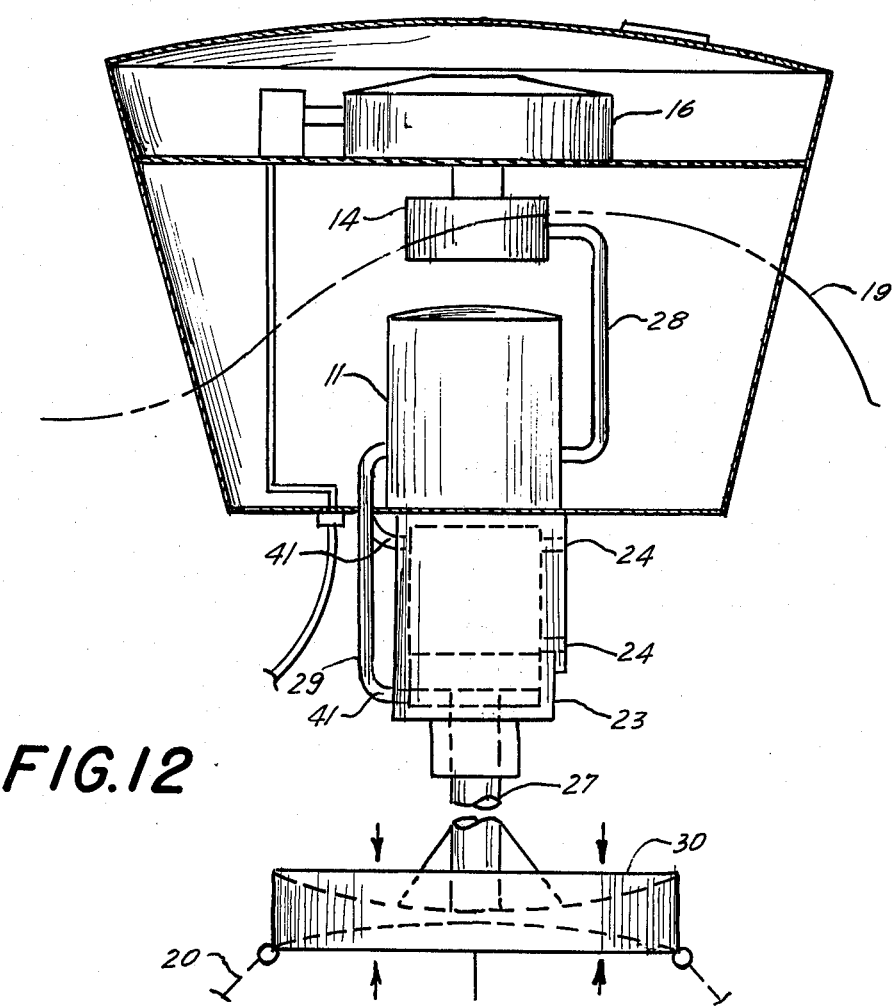
FIG. 12 is a section through a different construction along the line XII—XII of FIG. 13.

FIGS. 12 and 13 show an electrical station which actually consists of two parts. A single piston pump 23 is located in the middle of the round floating platform, at the lower part thereof. A rod 27, extending through the bottom of the pump, connects it with a disk 30, which is attached by chains 20 with the weights upon the bottom of the ocean. The pump has two suction openings 24' and two outflow openings 41. The outflow openings transmit water to a water accumulator 11" which is connected with a hydraulic motor 14".

The device is operated as follows:

When waves move up and down, the platform will also move with the waves. The piston pump is firmly connected with the platform while its piston is firmly connected with the rod 27 and the disk 30, fixed by chains to the bottom of the ocean and remaining immovable. Thus, the platform will move relatively to the disk 30, and the piston of the cylinder will suck in water and transmit it to the water accumulator 11". From there, water will flow under pressure to the hydraulic motor 14", which will operate the generator.

Figure 14:
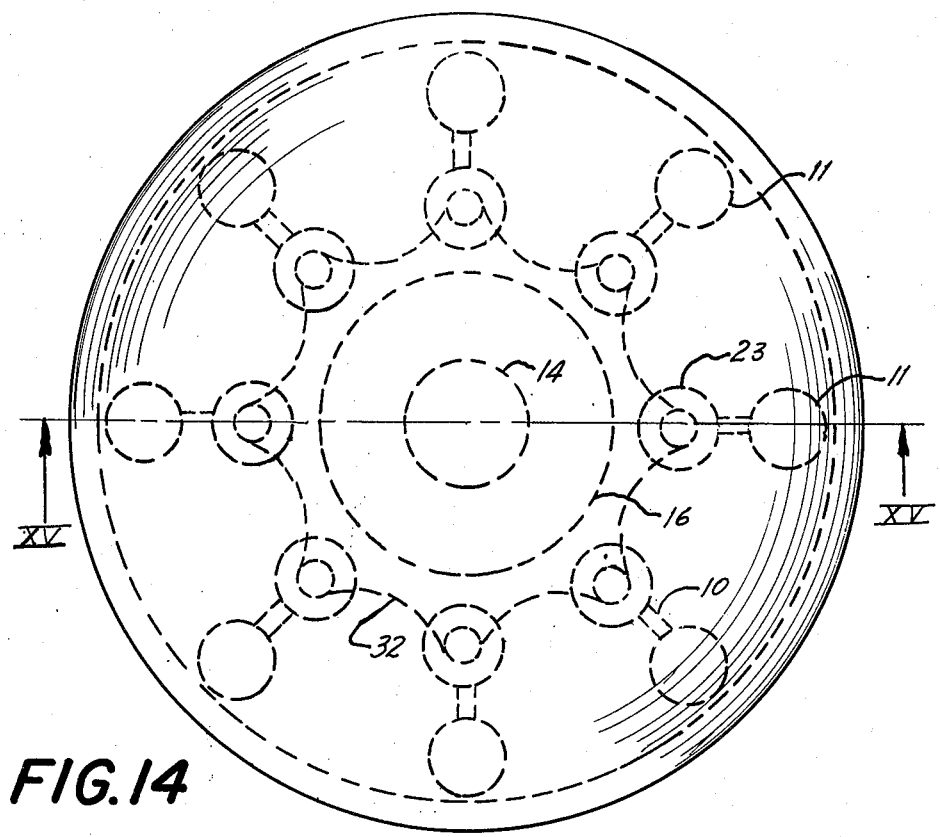
FIG. 14 is a top view of a different construction.
Figure 15:
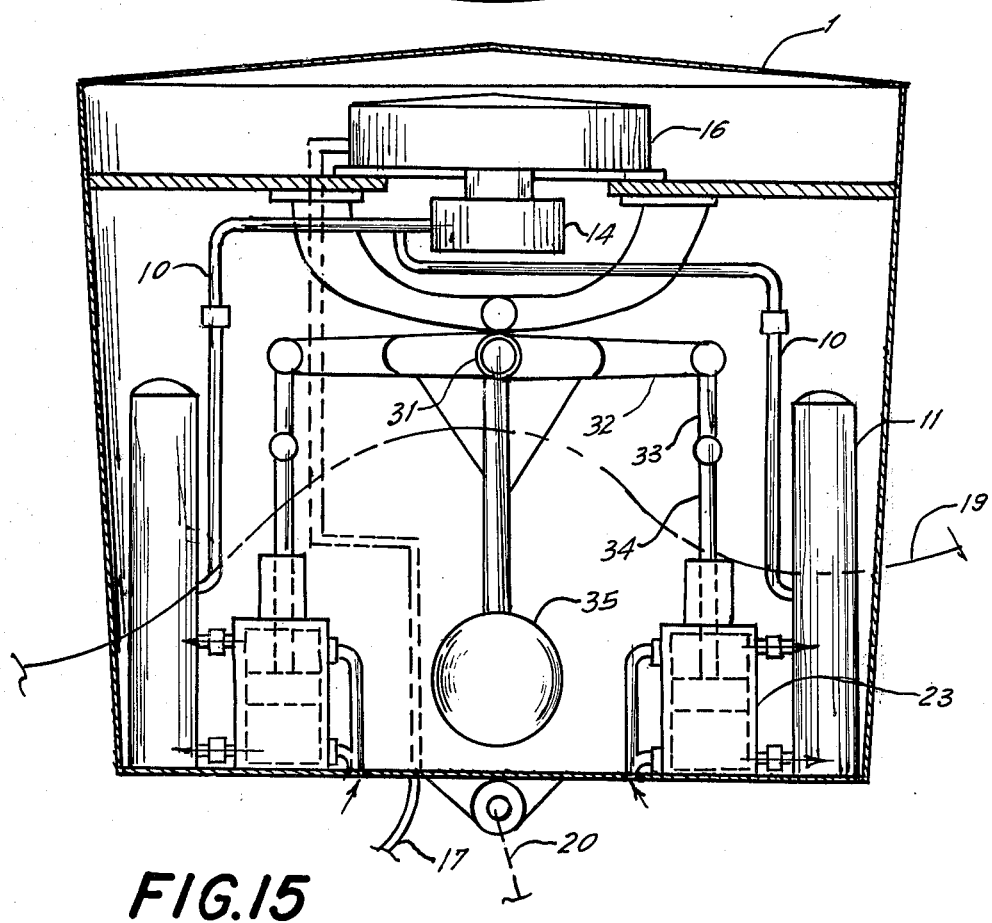
FIG. 15 is a section along the line XV—XV of FIG. 14.

FIGS. 14 and 15 show a platform, in the middle of which is located a heavy pendulum 35 firmly connected to a disk 32 and swingably mounted inside the platform by a universal joint 31. The disk 32 has outer circumferential projections pivotally connected with downwardly extending line 33. The line 33 is pivotally connected with the rod 34 of piston pump 23' firmly mounted upon the bottom of the platform. A chain 20 is attached to the center of this bottom, and is held by a weight upon the ocean.

When the waves move the platform, it will be swung in different directions, but the heavy pendulum will endeavor to keep its vertical position. All pistons of cylinders located around the pendulum will move to a different extent. They will suck in water and transmit it to the water accumulators. From these accumulators, water will be transmitted to the hydraulic motor, which will operate the generator in the already-described manner.

I claim:

1. An electrical station, comprising a platform capable of floating upon the surface of water which produces waves, means connecting said platform to the water bottom and comprising a plurality of chains having ends connected with the platform and circumferentially spaced, a hydraulic drive carried by said platform, a generator connected with said hydraulic drive, and a device operable by the kinetic action of said waves and actuating said hydraulic motor, said device comprising a plurality of hydraulic turbines mounted in a circle upon the platform, each turbine having a container adapted to contain water, a vertical shaft in said container, wheels and blades connected with said shaft, another shaft located outside of said container, meshing gear wheels connecting the two shafts, and a delivery pump connected with said other shaft and having a water-receiving opening; a water accumulator located centrally in said platform, pipes connecting the delivery pump of each turbine with said water accumulator, said hydraulic drive being a centrally located hydraulic motor, and a pipe connecting said water accumulator with said hydraulic motor.

2. An electrical station, comprising a platform capable of floating upon the surface of water which produces waves, means connecting said platform to the water bottom and comprising a plurality of chains having ends connected with the platform and circumferentially spaced, a hydraulic drive carried by said platform, a generator connected with said hydraulic drive, and a device operable by the kinetic action of said waves and actuating said hydraulic motor, said device comprising a plurality of hydraulic turbines mounted in a circle upon the platform, each turbine having a container adapted to receive and contain water, a vertical shaft in said container, wheels and blades connected with said shaft, the station having a separate generator for each turbine, and separate means connecting each generator with a separate turbine.

3. An electrical station, comprising a platform capable of floating upon the surface of water which produces waves, means connecting said platform to the water bottom and comprising a plurality of chains having ends connected with the platform and circumferentially spaced, a hydraulic drive carried by said platform, a generator connected with said hydraulic drive, and a device operable by the kinetic action of said waves and actuating said hydraulic motor, said device comprising a plurality of piston pumps mounted in a circle upon the platform and having upwardly extending rods, suction openings and outflow openings, a separate water accumulator located adjacent each pump and connected with its outflow openings, a disk located in the middle of the platform, a universal joint carried by said disk, a downwardly extending pendulum having an upper end connected with said joint, said disk having projections pivotally connected with the rods of the piston pumps, said hydraulic drive being a centrally located hydraulic motor, and pipes connecting said water accumulators with said hydraulic motor.

* * * * *